Sept. 29, 1936.  J. SCHWARTZMAN  2,055,754
UPHOLSTERY SPRINGS
Filed March 22, 1935
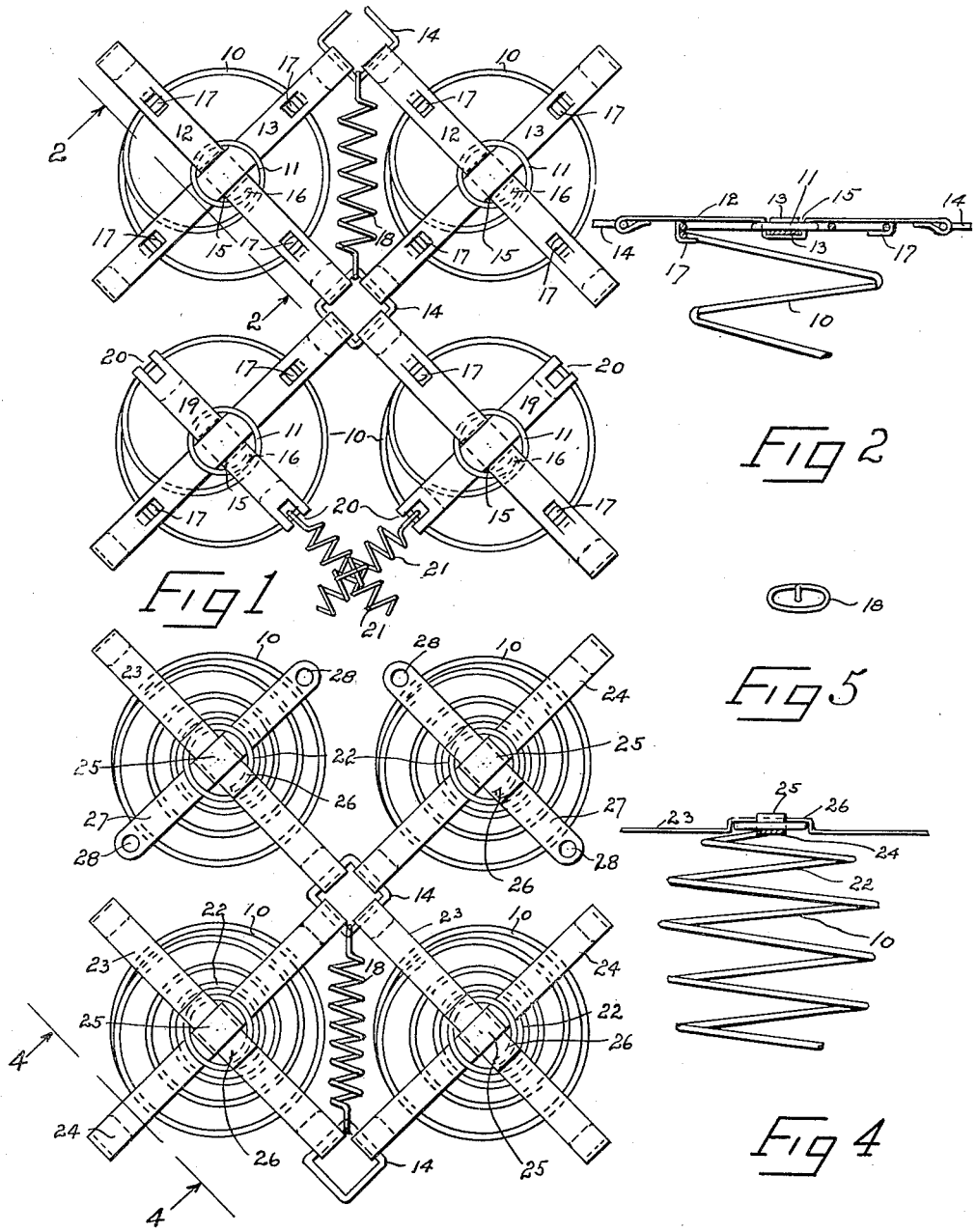
INVENTOR.
Jacob Schwartzman,
BY
ATTORNEYS.

Patented Sept. 29, 1936

2,055,754

UNITED STATES PATENT OFFICE 2,055,754

UPHOLSTERY SPRINGS

Jacob Schwartzman, Brooklyn, N. Y.

Application March 22, 1935, Serial No. 12,408

2 Claims. (Cl. 5—267)

The invention relates to upholstery springs as well as to the means used for assembling these springs into units such as for example for mattresses, furniture, automobile seats and the like. It has for one of its objects to provide springs which will be cheaper to manufacture, in that their ends need not be twisted around the last convolutions as is now customary, and which will give greater support over the centers of the springs so that less padding can be used without any danger of wear or tear to the unit in which the springs are used.

Another object is to provide means for firmly bracing and connecting the springs together so as to avoid displacement and to provide more even distribution of the weight on all the springs. A further object is to so construct these connecting means that they will not shift in relation to the springs nor allow the springs to tilt, as is often the case in the ordinary construction. A still further object is to so construct these connecting means, that they may be manufactured at a low cost and be attached to the springs with a minimum expenditure of time and labor.

These and various other objects and advantages will be readily understood from the following description and from the accompanying drawing of preferred embodiments of the invention, in which, however, modifications may be made without departing from the scope of the appended claims. In the drawing Fig. 1 shows a plurality of the improved springs connected with assembling means constructed in accordance with the invention;

Fig. 2 is a cross-sectional side view, taken on line 2—2, in Fig. 1;

Fig. 3 is another plan view of a modification of the springs, assembled with modified connecting means;

Fig. 4 is a side view, taken on line 4—4, in Fig. 3; and

Fig. 5 is an end view of certain helical springs used.

Referring first to Figs. 1 and 2, a plurality of upholstery springs are shown at 10. Instead of twisting the ends of the wires, from which the springs are made, around the upper convolutions of the springs, as is the customary manner, the ends are turned towards the center of the springs and formed into spirals, as shown at 11. A plurality of straps 12 and 13 connect the various springs in the assembly, their ends being bent over and hooked into a plurality of square rings 14. While the straps 13 are straight, the straps 12 are offset so as to form sockets 15 into which the straps 13 fit.

In attaching the straps to the spring 10, the strap 13 is first placed in the socket 15 and then the two straps are threaded in under the extreme end 16, of the spiral 11, and turned until the strap 13 is under the inner convolution of the spiral and the strap 12 is on top of the convolution; thus securely clamping them to the spring. Each of the straps has a tongue 17 sheared out some distance from each of its ends. These tongues are bent underneath the upper convolution of the spring 10 to clamp the spring to the straps, so as to locate the straps centrally with the spring.

The straps cover the center openings in the springs 10 and make it possible to use much less padding on top of these springs than would otherwise be the case. To cover the spaces between the springs 10, helical springs 18 may be secured between each corner of each of the square rings 14, as plainly shown. When such springs are employed they are preferably of oval shape, as shown in Fig. 5, so as to form a substantially flat surface with the straps. Furthermore, this oval shape gives more support to the padding used.

A somewhat modified strap is shown at 19. In this strap the ends are bent under the top convolution of the springs 10 and slots 20 are formed in the bent ends. When these straps are used, helical springs 21 are employed to connect the springs 10; the hooks on the helical springs being inserted through the slots 20.

In Figs. 3 and 4, in which the springs are also shown at 10, the spirals 22, which are formed on the upper ends of the springs, have several more convolutions and, instead of being in the same plane as the upper convolutions of the springs, these convolutions extend upwardly so as to form what may be termed auxiliary springs on top of the regular springs. Straps 23 and 24, somewhat similar to the straps employed in Figs. 1 and 2, are used in this case. However, both of the straps are offset in the center so that the offset 25 of the strap 24 fits inside the inner convolution of the spiral 22, while the offset 26 of the strap 23 fits on the outside of this convolution.

The straps are attached to the springs in a similar manner to the one previously described so that the inner convolution is on top of the strap 24 but underneath the offset 26 of the strap 23, while the offset 25 fits over the strap 23. In this manner the straps are securely clamped to the springs. The ends of the straps may be secured together by means of the square rings 14, or the straps may be constructed as shown at 27 where holes 28 are provided in the ends of the straps. In these holes helical springs, such as shown at 21, in Fig. 1, may be attached. Helical springs 18 may also be connected to each corner of each of the square rings, as plainly shown in the lower part of Fig. 3.

In this embodiment it will be seen that, when a weight is placed on the straps, the convolutions of the spiral 22 will compress until the straps rest on the first convolution of the regular spring 19; thus cushioning the weight before it is taken up by the regular spring.

While I have shown and described a certain type of upholstery springs, it is evident that the invention may be applied to various other shapes of springs used in the art. In like manner, while I have shown the straps placed diagonally in relation to the springs and with the springs in a certain relation to each other, it will be understood that the straps may be used in various other combinations with the springs.

Having described the invention and its objects, what I claim as new and wish to protect by Letters Patent is:

1. A spring structure of the class described comprising in combination; an upholstery spring having each of its ends formed into substantially flat spirals wound inwardly of the main body of the spring, the inner convolutions of each of said spirals formed substantially concentrically with the convolutions of the spring proper and adapted to form seats for pairs of crossed straps; and a pair of crossed straps secured in each of said seats, each of said straps provided at its ends with means whereby it may be connected to similar adjacent straps, and means provided near the ends of each strap securing it to the spring proper.

2. A spring structure of the class described comprising in combination; an upholstery spring having one of its ends formed into a substantially flat spiral wound inwardly of the main body of the spring, the inner convolution of said spiral formed substantially concentrically with the convolutions of the spring proper and adapted to form a seat for a pair of crossed straps; and a pair of crossed straps secured in said seat, each of said straps provided at its ends with means whereby it may be connected to similar adjacent straps, and means provided near the ends of each strap for securing it to the spring proper.

JACOB SCHWARTZMAN.